(12) United States Patent
Pashley et al.

(10) Patent No.: US 6,726,341 B2
(45) Date of Patent: Apr. 27, 2004

(54) LED ILLUMINATION FOR COLD STORAGE COMPARTMENTS

(75) Inventors: Michael D. Pashley, Cortlandt Manor, NY (US); Thomas M. Marshall, Hartsdale, NY (US); Ans Saalberg, Einchoven (NL); Larry McColloch, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/976,327

(22) Filed: Oct. 12, 2001

(65) Prior Publication Data

US 2003/0072147 A1 Apr. 17, 2003

(51) Int. Cl.[7] .................. F25D 27/00; H05B 33/12; F21V 8/00
(52) U.S. Cl. .................. 362/92; 362/133; 362/231; 362/295; 362/555; 362/562
(58) Field of Search .................. 362/92, 94, 127, 362/133, 154–156, 230, 231, 295, 551, 555, 560, 562

(56) References Cited

U.S. PATENT DOCUMENTS

| 4,706,169 | A | * | 11/1987 | Bussan et al. ................. 362/26 |
| 5,301,090 | A | * | 4/1994 | Hed ............................. 362/555 |
| 5,836,669 | A | * | 11/1998 | Hed ............................. 362/92 |
| 6,016,038 | A | * | 1/2000 | Mueller et al. ............. 315/291 |
| 6,210,013 | B1 | * | 4/2001 | Bousfield ...................... 362/92 |
| 6,217,188 | B1 | * | 4/2001 | Wainwright et al. ........ 362/555 |
| 6,637,924 | B2 | * | 10/2003 | Pelka et al. ................. 362/555 |
| 2002/0051357 | A1 | * | 5/2002 | Truttmann-Battig ......... 362/92 |
| 2003/0012035 | A1 | * | 1/2003 | Bernard ...................... 362/555 |

FOREIGN PATENT DOCUMENTS

JP 2000258052 A * 9/2000

OTHER PUBLICATIONS

U.S. patent application "Side–Emitting Rod for Use with an LED–Based Light Engine", Ser. No. 09/749,139, filed Dec. 27, 2000, pp. 1–11.

* cited by examiner

Primary Examiner—Alan Cariaso
(74) Attorney, Agent, or Firm—Eric M. Bram

(57) ABSTRACT

A storage compartment is equipped with a light emitting diode (LED) light source for illuminating contents inside the compartment. The LED light source includes a LED light engine outside the compartment and a light guide inside the compartment. The light guide is optically coupled to be LED light engine to bring light from the LED light engine into the compartment for providing illumination inside the compartment. The LED light engine may include red, green, and blue LEDs that contribute to the illumination inside the compartment. Respective outputs of the red, green, and blue LEDs may be separately controllable to allow a variably controlled color point of illumination inside the compartment. Total output of the LED light engine may be controllable to vary intensity of illumination inside the compartment.

19 Claims, 2 Drawing Sheets

LED ILLUMINATION FOR COLD STORAGE COMPARTMENTS

FIELD OF THE INVENTION

The invention relates to LED illumination, and more particularly to LED illumination of cold storage compartments, for example commercial freezer cabinets.

BACKGROUND AND SUMMARY

Large commercial freezer cabinets are used to show and store products in food markets and elsewhere. Usually the types of freezer cabinets found in supermarkets have transparent doors, and the products inside are illuminated. Currently, fluorescent lighting usually is used to illuminate these products. The fluorescent lamps are usually positioned at the door posts of the cabinets.

This type of illumination system has several drawbacks. For one thing, the light source is generally inside the freezer, and therefore it produces heat. This requires extra cooling power to compensate for heat production caused by lighting.

Another problem is that due to the low temperatures within the cabinets, efficiency of the fluorescent lamps decreases. For example, at an ambient temperature of 0° Centigrade (C.), efficiency can be half of what it would be at an ambient temperature of 25° C.

Also, starting the fluorescent lamps can be a problem that due to low temperatures. In order to avoid these problems, users of the cabinets often leave the freezer lighting on continually, even during hours when no one is likely to be looking into the cabinets—for example when a store is closed for the evening. This wastes energy.

Another problem is that low temperatures negatively impact fluorescent tube gas discharge stability, resulting in flickering of the lamp.

Additionally, fluorescent lighting requires high-voltage inside the freezer, which could cause safety problems, particularly while cleaning the lamp.

Further, lifetime of fluorescent lamps is generally limited to 10,000 hours. If a single lamp in the freezer fails, immediate replacement is necessary.

Further, light distribution with fluorescent lighting is not optimal for providing even vertical illumination. Products nearer the lamps will be illuminated more brightly then products in between the lamps.

To address at least some of these problems, the present invention provides a storage compartment equipped with a light emitting diode (LED) light source for illuminating contents inside the compartment. The LED light source comprises an LED light engine outside the compartment and a light guide inside the compartment. The light is optically coupled to be LED light engine for bringing light illumination from the LED light engine into the compartment via the light guide.

BRIEF DESCRIPTION OF THE DRAWING FIGURES

DETAILED DESCRIPTION

Figure 1:
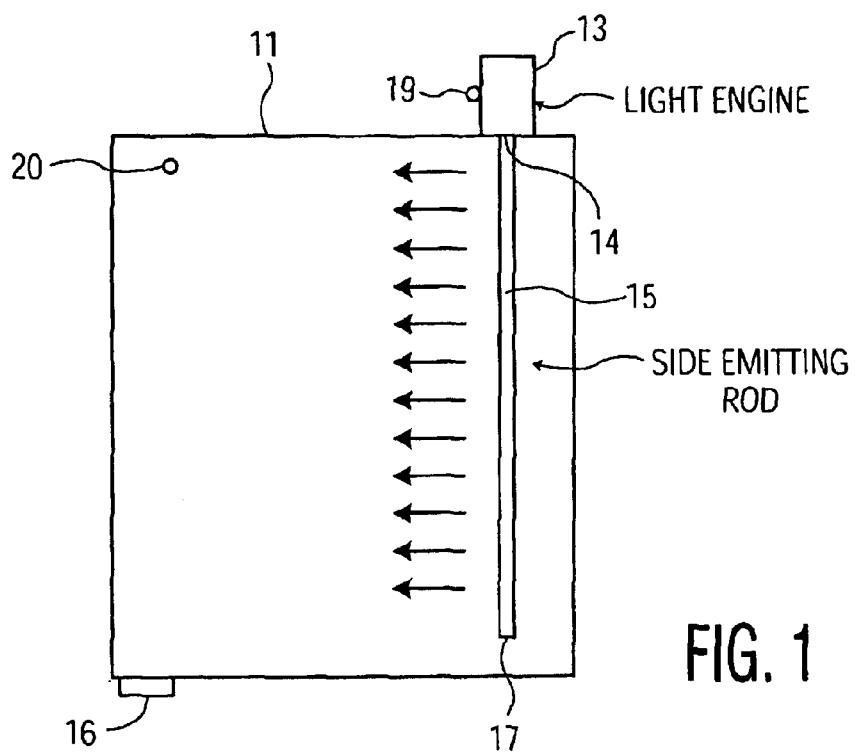
FIG. 1 is a diagrammatic side view of a storage compartment according to the invention.

FIG. 1 illustrates a storage compartment, in this case a commercial supermarket freezer cabinet 11, equipped with an LED light source according to the invention. An LED light engine 13 couples light into the end of a rigid rod 15, acting as a light guide, that extends into the cabinet 11. The rod 15 shown in this embodiment is side-emitting. It can be typically 10–30 mm in diameter and 0.5–2 m in length, and round in cross-section so as to replace a standard fluorescent tube, although of course rods of any number of other dimensions can also be used with the invention.

Figure 2:
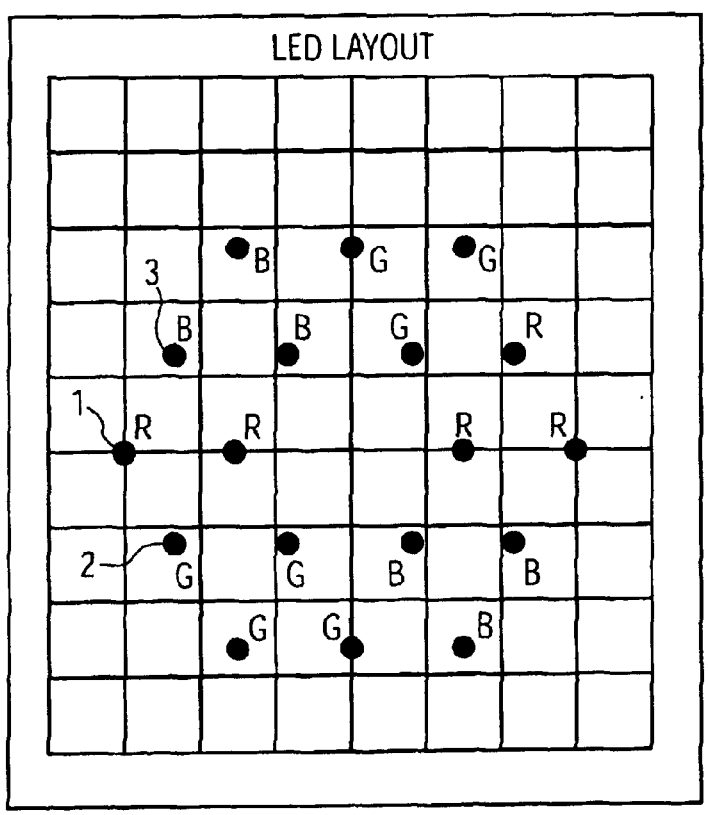
FIG. 2 is one possible embodiment for LED placement configuration for a light engine used in the invention.

The light engine 13 will typically utilize an array of three different color LEDs 1, 2, 3. Any number of possible arrangements may be envisioned. For example, FIG. 2 show a hexagonal array of red (R), green (G), and blue (B) LEDs provided at an aperture 14 of the light engine 13. Each LED can be provided with an optical element (not shown) to collect and partially collimate the light emitted from the LED, and a condenser lens (not shown) arranged to focus the combined partially collimated beams from all the LEDs, and to focus the light onto the input aperture of the rod. The red, green, and blue LEDs R, G, B should preferably be arranged in such a way as to maximize color mixing in the rod. Additionally, the LED light engine 13 preferably includes thermal management such as a heat sink and/or cooling fan (not shown) to keep heat from entering the cabinet.

Figure 3:
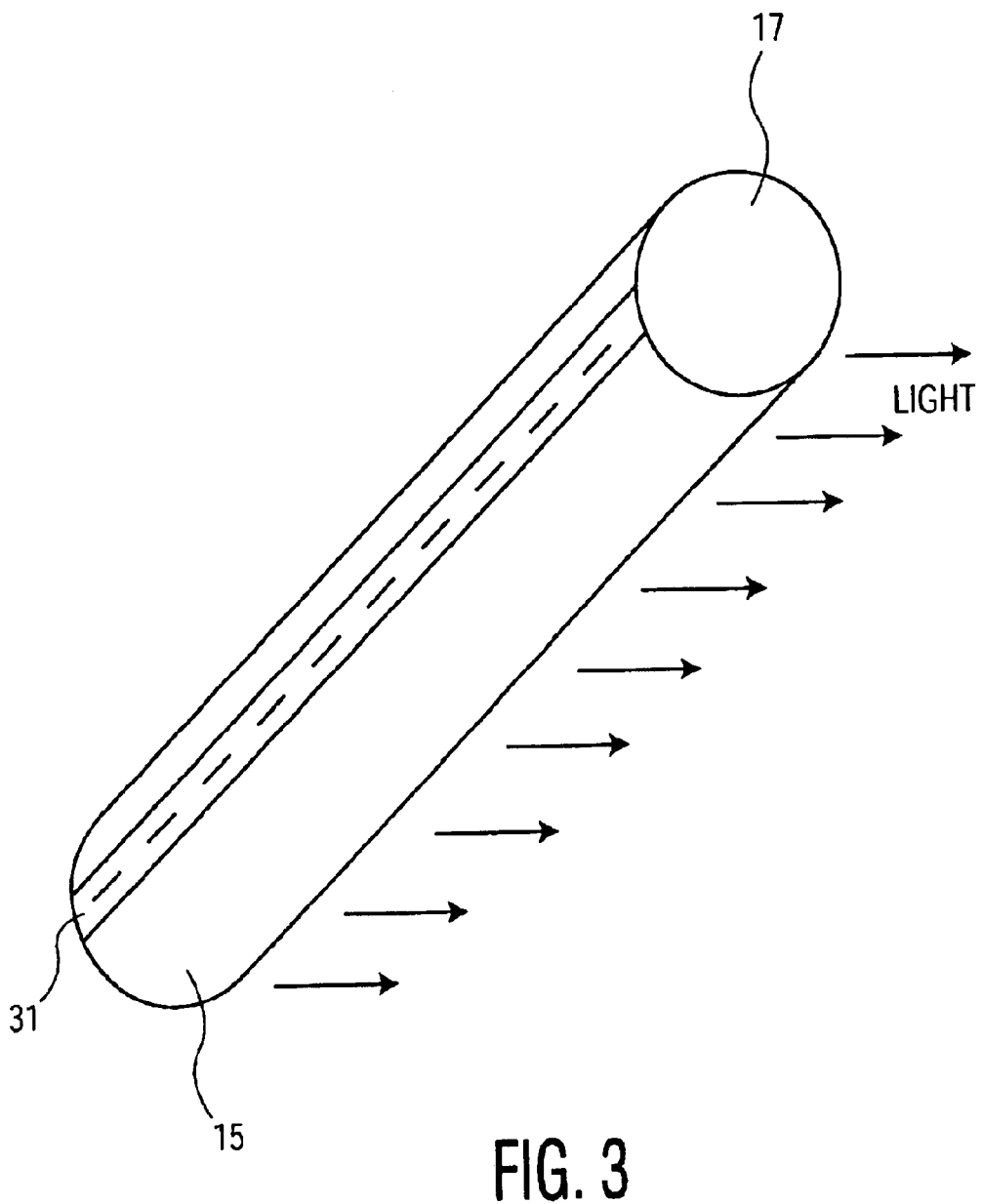
FIG. 3 is a perspective view of a light guide rod used in the invention.

The rod 15 is designed with suitable optical outcoupling such that light injected in at one end is uniformly coupled out of the side of the rod along its length. The rod may also include a mirror 17 at an end away from the light engine to recycle light that does not outcouple on the first pass. Light travels through the rod 15 by total internal reflection (TIR). As shown in FIG. 3, rigid rod 15 in this illustrated embodiment has a stripe 31 of white paint along its length. Light that hits the white paint is scattered, and that portion of it that no longer meets the TIR condition for the rod 15 exits the side of the rod 15. Of course, other embodiments may utilize any other of the many known scattering technique, for example mechanical notches and pits.

Light that reaches the end of the rod 15 is reflected from the mirror 17 and passes back down the length of the rod 15, increasing the outcoupling efficiency of the system. The outcoupling efficiency does depend, in part, on the angular distribution of the input light. Light traveling at a high angle relative to the optical axis of the rod is outcoupled more rapidly than light traveling nearly parallel to the optical axis of the rod 15. The angular distribution of input light can be optimized for the system. Generally, it is better to have a distribution with low flux along the optical axis of the rod 15. This can be controlled by the arrangement of LEDs R, G, B and optics inside the LED light engine 13 used as a light source for the rod 15.

Angular distribution of light is influenced by the width of the paint stripe, as discussed in copending patent application 09/749,139. Broader output distribution results from increased angular width of the paint. Angular distribution can also be influenced by variations in the size and shape of the rod 15. As previously mentioned, length and width can be varied. In addition, and of particular interest for adjusting angular distribution of the light within the tube, the cross-sections of the tube may be elliptical, square, or more generally, any combination of straight and curved edges, possibly varying in configuration along the length of the rod. Such variations allow further control of the output angular distribution, permitting an inexpensive customization of distinct illumination products. It is also possible to vary the width of the paint stripe along the rod to gain still more control of the output angular distribution.

In freezer compartments it will usually be desirable to have the outcoupled light intensity be uniform along the rod.

This can be achieved by correctly varying the effective paint density along the rod 15. For uniform light intensity along the rod 15, paint density generally needs to be lower close to the light source than far away from the light source. This is easily achieved by replacing the solid stripe of paint 31 with a series of stripes perpendicular to the length of rod 15, and varying the spacing between these small stripes and/or the width of these stripes (in the direction along the rod). Alternatively, the paint stripe can include fine white dots with varying packing density.

A light illumination system according to the invention also preferably includes drive and control electronics that take electricity and generate suitable current sources to independently drive the red, green, and blue LEDs R, G, B. This control circuitry can be digital or analog, and can be used to ensure that a desired color point of the resulting illumination is maintained. The control circuitry can be operated automatically or using a user interface 16.

Depending on application requirements, this may include thermal and/or optical feedback sensors 19, 20, in the light engine 13 or within the cabinet 11 to provide feedback control for the control system. Examples of feedback signal sources that can be used for control include heat sink temperature, intensity of each of the color components of the illumination, optical signals that give a measure of the wavelength of each of the color components, or a color sensor that can control color point of the illumination automatically depending on the color or colors of items within the cabinet 11. For control system may also have built-in color set points or include a facility for programming any user-defined color point and dynamic color effects.

The above described embodiment is illustrative but not restricting. It is understood that many variants to the above-described scheme are possible. For example, The invention can be used with phosphor-covered LED's as well as RGB (red, green and blue) LED's. The phosphors can be used to convert a blue LED to white. A phosphor coated LED may not be adjustable in color by the customer, but it can be used to make a white light source.

As another example, the rods or other light guides may be flexible and designed to fit contours of the freezer cabinet. Other types of light guides such as fiber optic light guides may be used. The LEDs may be arranged as distributed sources along the edge of a plate waveguide. This plate could then outcouple light from one of its main faces. Plate(s) could also be placed on the rear and/or side walls of a freezer cabinet, the roof and/or floor of the freezer cabinet, integrated into shelves within the freezer cabinet, or any combination thereof.

INDUSTRIAL APPLICABILITY

Aside from solving one or more problems associated with existing fluorescent lighting systems and freezers, various embodiments of the invention can provide other advantages as well. For example, a white-light LED engine can generate white light from a combination of red, green, and blue LEDs with a high rendering. These individual color components can be separately controlled, allowing the resulting color point of the LED light engine to be varied according to the wishes of the user, by operation through a control panel for example. This adds a new feature to commercial freezer illumination previously not available without changing fluorescent tubes. The LED illumination color point can be adjusted to almost any desired value.

For example, if the product or packaging colors of the goods for sale in the freezer cabinet are largely reds and greens, a warm white color (lower color temperature) can be selected to highlight the colors of the packages. On the other hand, if the packaging is generally blue and white, they can be made to appear more attractive by using a cooler (higher color temperature) white light.

In-store advertising is increasingly used to attract customers to particular brands. The LED illumination system allows for the brand owner to have a distinctive lighting arrangement involving static and/or dynamic colors. The dynamic effects may include flashing primary colors, smooth variations from one color to another, different practice levels, variations in the white color, etc. A freezer with an installed LED lighting system can also be programmed to the requirements of whichever brand is being promoted at a particular time.

While this invention has been described in conjunction with specific embodiments outlined above, it is evident that many alternatives, modifications and variations will be apparent to those skilled in the art. Accordingly, the preferred embodiments of the invention as set forth herein are intended to be illustrative, not limiting. Various changes may be made without departing from the scope of the claimed invention. Additionally, other aspects and advantages of the invention can be obtained from a study of the disclosure, the drawing figures, and the appended claims.

We claim:

1. A storage compartment equipped with a light emitting diode (LED) light source for illuminating contents inside the compartment, the LED light source comprising a LED light engine including a two-dimensional arrangement of LEDs outside the compartment and a light guide inside the compartment, the light guide being optically coupled to the LED light engine for bringing light illumination from the LED light engine into the compartment via the light guide, such that the two-dimensional pattern of LEDs forms an angular distribution of light input into the light guide with respect to the optical axis of the light guide.

2. The storage compartment of claim 1, in which output of the LED light engine is controllable to vary intensity of the illumination inside the compartment.

3. The storage compartment of claim 1, the LED light engine including a plurality of different colors of LEDs that contribute to the illumination inside the compartment.

4. The storage compartment of claim 3, the plurality of different colors including first, second, and third colors.

5. The storage compartment of claim 4, wherein the first, second, and third colors are red, green, and blue, respectively.

6. The storage compartment of claim 4, in which respective outputs of the first, second, and third color LEDs are separately controllable to allow a variably controlled color point of the illumination inside the compartment.

7. The storage compartment of claim 6, in which total output of the first, second, and third color LEDs is controllable to vary intensity of the illumination inside the compartment.

8. The storage compartment of claim 4, an which total output of the first, second, and third color LEDs is controllable to vary intensity of the illumination inside the compartment.

9. A method for illuminating frozen foods in a freezer cabinets, comprising:

providing a freezer cabinet with an externally mounted LED light engine including a plurality of LEDs arranged in a two-dimensional pattern, providing the freezer cabinet with a light guide extending inside the cabinet, optically coupling the LED light engine to the light guide such that the two dimensional pattern of LEDs forms an angular distribution of light input into the light guide with respect to the optical axis of the light guide, and operating the LED light engine such that light is passed via the light guide into the interior of the cabinet to provide interior cabinet illumination at a first steady light level.

10. The method of claim 9, including varying output of the LED light engine to provide interior cabinet illumination at a second steady light level different from the first light level.

11. The method of claim 9, including providing the LED light engine with a plurality of different colors of LEDs that contribute to the illumination inside the compartment.

12. The method of claim 11, the plurality of different colors including first, second, and third colors.

13. The method of claim 12, with the first, second, and third colors are red, green, and blue, respectively.

14. The method of claim 12, including varying respective outputs of the first, second, and third color LEDs to control color point of the illumination inside the compartment.

15. A method for illuminating frozen foods in a freezer cabinets, comprising:

providing a freezer cabinet with an externally mounted LED light engine provided with a plurality of different colors of LEDs, including first, second, and third colors, that contribute to the illumination inside the compartment, providing the freezer cabinet with a light guide extending inside the cabinet, optically/coupling the LED light engine to the light guide, and operating the LED light engine such that light is passed via the light guide into the interior of the cabinet to provide interior cabinet illumination at a first steady light level;

varying respective outputs of the first, second, and third color LEDs to control color point of the illumination inside the compartment; and providing at least one feedback sensor in at least one of the light engine and the cabinet, and controlling the color point of the Illumination based on a signal received from the at least one feedback sensor.

16. The method of claim 15, wherein the feedback sensor senses color of contents of the cabinet and the color point of the illumination is changed automatically depending on the color of the contents of the cabinet.

17. A method for illuminating frozen foods in a freezer cabinets, comprising:

providing a freezer cabinet with an externally mounted LED light engine provided with a plurality of different colors of LEDs, including first, second, and third colors, that contribute to the illumination inside the compartment, providing the freezer cabinet with a light guide extending inside the cabinet, optically coupling the LED light engine to the light guide, and operating the LED light engine such that light is passed via the light guide into the interior of the cabinet to provide interior cabinet illumination at a first steady light level;

varying respective outputs of the first, second, and third color LEDs to control color point of the illumination inside the compartment; and providing a user interface, and controlling the color point of the illumination based on a signal received from the user interface.

18. The method of claim 14, including varying total output of the first, second, and third color LEDs to vary total intensity of the illumination inside the compartment.

19. The method of claim 12, including varying total output of the first, second, and third color LEDs to vary total intensity of the illumination inside the compartment.

* * * * *